(12) United States Patent
Sellers et al.

(10) Patent No.: US 7,260,273 B2
(45) Date of Patent: Aug. 21, 2007

(54) SYSTEM AND METHOD OF EDITING A DIGITAL IMAGE TO REMOVE UNWANTED ARTIFACTS, OBJECTS AND THE LIKE

(75) Inventors: Graham Sellers, Toronto (CA); Sachin Agrawal, Mississauga (CA)

(73) Assignee: Seiko Epson Corporation, Tokyo (JP)

( * ) Notice: Subject to any disclaimer, the term of this patent is extended or adjusted under 35 U.S.C. 154(b) by 838 days.

(21) Appl. No.: 10/637,344

(22) Filed: Aug. 8, 2003

(65) Prior Publication Data

US 2005/0031225 A1   Feb. 10, 2005

(51) Int. Cl.
G06K 9/36 (2006.01)
G09G 5/00 (2006.01)

(52) U.S. Cl. .................. 382/275; 345/582; 345/629; 382/282; 382/284; 382/286

(58) Field of Classification Search .......... 382/254, 382/274, 275, 279, 282, 284, 286; 345/426, 345/430, 561, 582, 594, 600, 615, 628, 428, 345/629
See application file for complete search history.

(56) References Cited

U.S. PATENT DOCUMENTS

| 4,590,558 A | 5/1986 | Glover et al. |
| 5,036,405 A | 7/1991 | Kojima |
| 5,467,441 A | 11/1995 | Stone et al. |
| 5,555,194 A | 9/1996 | Cok |
| 5,784,498 A | 7/1998 | Venable |
| 5,892,853 A | 4/1999 | Hirani et al. |
| 6,134,346 A | 10/2000 | Berman et al. |
| 6,259,462 B1 * | 7/2001 | Gruber et al. ............ 345/561 |
| 6,268,861 B1 * | 7/2001 | Sanz-Pastor et al. ...... 345/426 |
| 6,333,993 B1 | 12/2001 | Sakamoto |
| 6,587,592 B2 * | 7/2003 | Georgiev et al. .......... 382/254 |

* cited by examiner

Primary Examiner—Kanjibhai Patel
(74) Attorney, Agent, or Firm—Mark P. Watson

(57) ABSTRACT

A system and method of editing a digital image to remove an unwanted object includes designating a rectangular region of the digital image including a subset of pixels within the digital image that includes the object to be removed. A band of pixels adjacent one major side of the rectangular region is selected and a mirror of the selected band of pixels is copied in a repeating pattern to define a first matrix corresponding in size to the designated region. A band of pixels adjacent the opposite major side of the rectangular region is then selected and a mirror of the selected band of pixels is copied in a repeating pattern to define a second pixel matrix corresponding in size to the designated region. The pixels of the first and second matrices are blended according to a first blending equation to create an initial texture. A band of pixels adjacent one minor side of the rectangular region is then selected and a mirror of the selected band of pixels is blended with a band pixels of similar width in the initial texture that extends along the one minor side. A band of pixels adjacent the other minor side of the rectangular region is then selected and a mirror of the selected band of pixels is blended with a band of pixels of similar width in the initial texture that extends along the other minor side thereby to complete the texture. The pixels within the designated region are replaced with the texture thereby to remove the object from the digital image.

32 Claims, 11 Drawing Sheets

FIG. 3a

| | | | | | | | | | |
|---|---|---|---|---|---|---|---|---|---|
|  | $P_{-1,7}$ | $P_{-1,8}$ | $P_{-1,9}$ | . | . | . | . | . | . |
|  | $P_{0,7}$ | $P_{0,8}$ | $P_{0,9}$ | $P_{0,10}$ | . | . | . | . | . |
|  | $P_{1,6}$ | $P_{1,5}$ | $P_{1,4}$ | $P_{1,6}$ | $P_{1,5}$ | $P_{1,4}$ | $P_{1,6}$ | $P_{1,5}$ | $P_{1,4}$ |
|  | $P_{2,6}$ | $P_{2,5}$ | $P_{2,4}$ | $P_{2,6}$ | $P_{2,5}$ | $P_{2,4}$ | $P_{2,6}$ | $P_{2,5}$ | $P_{2,4}$ |
|  | $P_{3,6}$ | $P_{3,5}$ | $P_{3,4}$ | $P_{3,6}$ | $P_{3,5}$ | $P_{3,4}$ | $P_{3,6}$ | $P_{3,5}$ | $P_{3,4}$ |
|  | $P_{N,6}$ | $P_{N,5}$ | $P_{N,4}$ | $P_{N,6}$ | $P_{N,5}$ | $P_{N,4}$ | $P_{N,6}$ | $P_{N,5}$ | $P_{N,4}$ |
|  | $P_{N+1,7}$ | $P_{N+1,8}$ | $P_{N+1,9}$ | . | . | . | . | . | . |
|  | $P_{N+2,7}$ | $P_{N+2,7}$ | $P_{N+2,7}$ | . | . | . | . | . | . |

GRAPH OF $y = \dfrac{1}{1 + e^{-x}}$

SYSTEM AND METHOD OF EDITING A DIGITAL IMAGE TO REMOVE UNWANTED ARTIFACTS, OBJECTS AND THE LIKE

FIELD OF THE INVENTION

The present invention relates generally to image processing and in particular to a system and method of editing a digital image to remove unwanted artefacts, objects and the like.

BACKGROUND OF THE INVENTION

Digital cameras are becoming increasingly popular and as a result, a demand for image processing software that allows photographers to edit digital images exists. In many instances, unwanted objects and/or artefacts are captured in digital images. Removing these unwanted objects and/or artefacts from the digital images without degrading image quality is often desired.

Many techniques for removing artefacts from images have been considered. For example, U.S. Pat. No. 4,590,558 to Glover et al. discloses a method and apparatus for removing objects from CT images in which localized regions of the original object are not reproduced in order to illuminate artefacts generated by objects within those regions. An operator defines a rub-out region encompassing the object to be removed. An average function within the rub-out region, which is strongly influenced by the discontinuity created by the object, is then created. The projection set is modified using the average function to eliminate the object from the projection set. The modified projection set is then used to create a reconstructed image.

U.S. Pat. No. 5,036,405 to Kojima discloses an image amending method wherein selected pixel data to replace original pixel data is generated based primarily on ordinary pixels, which are adjacent the original pixels to be replaced. Pixels around an attention pixel to be replaced are classified into groups in accordance with their closeness to the attention pixel. Depending on the nature of the attention pixel, different pixels surrounding the attention pixel are examined to determine the value of the pixel to be used to replace the attention pixel.

U.S. Pat. No. 5,555,194 to Cok discloses a cloning technique for digital image retouching. During the cloning technique, a cloned area and a surround area are determined. Using image pixel values, the mean, slope and quadratic coefficient in each colour are computed for the cloned area and the surround area and if desired for sub-regions of the surround area. The values of the cloned pixels are adjusted so that their mean, slope and quadratic term match the mean, slope and quadratic term of the surround area or of the best fitting sub-region of the surround area.

U.S. Pat. No. 5,784,498 to Venable discloses a method for synthesizing background texture in an image. During the method, a texture exemplar from an image is selected and an area to be back filled is identified. An estimate of the synthesized texture is generated and predetermined spatial domain constraints are applied to the estimate. The spatial domain constraint estimate is operated upon by a Fourier transform to create a spectral function. Predetermined spectral domain constraints are applied to the spectral function and an inverse Fourier transform is performed to produce a synthesized texture. The synthesized texture is inserted into the area of the image to be back filled if it is determined to be adequate.

U.S. Pat. No. 5,892,853 to Hirani et al. discloses a method for removing scratch and wire noise from digitized images. The method utilizes a soft edge noise mass to allow a smoother blending of the reconstructed noise and the image around the noise. The method utilizes both spatial and frequency domains to reconstruct contiguous noisy pixels and reconstruct textures.

Although the above-described references disclose methods for editing images, there exists a need for an improved system and method of removing unwanted objects and/or artefacts from a digital image. It is therefore an object of the present invention to provide a novel system and method of editing a digital image to remove unwanted artefacts, objects and the like.

SUMMARY OF THE INVENTION

According to one aspect of the present invention there is provided a method of creating a texture to replace a designated area of a digital image comprising the steps of:

selecting bands of pixels corresponding in value to pixels of said digital image that border said designated area; and blending the selected bands of pixels according to a first blending equation to create said texture.

In a preferred embodiment, after the blending, further bands of pixels that border the designated area are selected and blended with the pixels in the texture. It is also preferred that the designated area is delineated by a geometric shape in the form of a rectangle. In this case, during the selecting, bands of pixels of width MaxPoints bordering opposite major sides of the rectangle are selected and wherein during the further selecting, bands of pixels of width M bordering opposite minor sides of the rectangle are selected. A mirror of the selected band of pixels having width MaxPoints on each opposite major side of the rectangle is copied in a repeating pattern to define a pixel matrix corresponding in size to the designated area and the defined pixel matrices are blended according to the first blending equation to create the texture.

In the preferred embodiment, the first blending equation is of the form:

TextureFillValue=PixelWeight1*pixel1+(1−PixelWeight1)*pixel2 where:
pixel1 is the pixel at location (x,y) in the matrix created during copying of the mirror of the selected pixel band adjacent one of the major sides;
pixel2 is the pixel at location (N+1−x,N+1−y) in the matrix created during copying of the mirror of the selected pixel band adjacent the other of the major sides;
PixelWeight1 is a first blending function; and
TextureFillValue is the resulting texture pixel at location (x,y) of the texture.

The first blending function is expressed as:

PixelWeight1=1.0/(1.0+exp(−ExponentScale*x−HalfWidth))−(CosAmplitude*cos(y*CosFrequency))

where:
x is the x co-ordinate relative to the top left corner of the designated rectangular area;
y is the y co-ordinate relative to the top left corner of the designated rectangular area;

HalfWidth is one half of the width of the designated rectangular area;

ExponentScale is the gradient of the first blending function; and

CosAmplitude, CosFrequency are characteristics of the blending boundary.

In the preferred embodiment, the blending of the further selected bands of pixels is performed using a second blending equation expressed as:

TextureFillValue=-PixelWeight2*pixel1+(1-PixelWeight2)*pixel2 where:
pixel1 is the pixel in the texture at location (x,y);
pixel2 is the value of a pixel in the band bordering a minor side of the designated rectangular area adjacent pixel1 and positioned outside of the designated rectangular area by the same distance as pixel1 is within the texture;
PixelWeight2 is a second blending function; and
TextureFillValue is the resulting texture pixel at location (x,y).

The second blending function is expressed as:

PixelWeight2=(# of pixels from the edge of the minor side of the designated rectangular area)/$M$ where:
M is the width of the pixel band.

According to another aspect of the present invention there is provided a method of editing a digital image to remove an unwanted object comprising the steps of:

designating a rectangular region of said digital image including a subset of pixels within said digital image that includes the object to be removed;

selecting a band of pixels adjacent one major side of said rectangular region and copying a mirror of the selected band of pixels in a repeating pattern to define a first pixel matrix corresponding in size to said designated region;

selecting a band of pixels adjacent the opposite major side of said rectangular region and copying a mirror of the selected band of pixels in a repeating pattern to define a second pixel matrix corresponding in size to said designated region;

blending the pixels of said first and second matrices in accordance with a first blending equation to create an initial texture;

selecting a band of pixels adjacent one minor side of said rectangular region and blending a mirror of the selected band of pixels with a band of pixels of similar width in said initial texture that extends along said one minor side; and selecting a band of pixels adjacent the other minor side of said rectangular region and blending a mirror of the selected band of pixels with a band of pixels of similar width in said initial texture that extends along said other minor side to complete said texture, said texture replacing the pixels within said designated region thereby to remove said object.

According to yet another aspect of the present invention there is provided a digital imaging editing tool for editing a digital image to remove an unwanted object comprising:

means for designating a rectangular region of said digital image including a subset of pixels within said digital image that includes the object to be removed;

means for selecting a band of pixels adjacent one major side of said rectangular region and copying a mirror of the selected band of pixels in a repeating pattern to define a first pixel matrix corresponding in size to said designated region;

means for selecting a band of pixels adjacent the opposite major side of said rectangular region and copying a mirror of the selected band of pixels in a repeating pattern to define a second pixel matrix corresponding in size to said designated region;

means for blending the pixels of said first and second matrices in accordance with a first blending equation to create an initial texture;

means for selecting a band of pixels adjacent one minor side of said rectangular region and blending a mirror of the selected band of pixels with a band of pixels of similar width in said initial texture that extends along said one minor side; and means for selecting a band of pixels adjacent the other minor side of said rectangular region and blending a mirror of the selected band of pixels with a band of pixels of similar width in said initial texture that extends along said other minor side to complete said texture, said texture replacing the pixels within said designated region thereby to remove said object.

According to still yet another aspect of the present invention there is provided a computer readable medium embodying a computer program for editing a digital image to remove an unwanted object, said computer program including:

computer program code for designating a rectangular region of said digital image including a subset of pixels within said digital image that includes the object to be removed;

computer program code for selecting a band of pixels adjacent one major side of said rectangular region and copying a mirror of the selected band of pixels in a repeating pattern to define a first pixel matrix corresponding in size to said designated region;

computer program code for selecting a band of pixels adjacent the opposite major side of said rectangular region and copying a mirror of the selected band of pixels in a repeating pattern to define a second pixel matrix corresponding in size to said designated region;

computer program code for blending the pixels of said first and second matrices in accordance with a first blending equation to create an initial texture;

computer program code for selecting a band of pixels adjacent one minor side of said rectangular region and blending a mirror of the selected band of pixels with a band of pixels of similar width in said initial texture that extends along said one minor side in accordance with a second blending equation different than said first blending equation; and computer program code for selecting a band of pixels adjacent the other minor side of said rectangular region and blending a mirror of the selected band of pixels with a band of pixels of similar width in said initial texture that extends along said other minor side in according with said second blending equation to complete said texture, said texture replacing the pixels within said designated region thereby to remove said object.

The present invention provides advantages in that when an unwanted object is located within a designated rectangular area of the digital image, the unwanted object can be removed and replaced with an appropriate background or texture that is basically indistinguishable from the surrounding background of the digital image.

BRIEF DESCRIPTION OF THE DRAWINGS

An embodiment of the present invention will now be described more fully with reference to the accompanying drawings in which:

FIG. 3*a* shows a first matrix filled with a band of pixels in a repeating pattern, the band of pixels being a mirror of a band of pixels bordering a major side of the designated rectangular area in the digital image;

DETAILED DESCRIPTION OF THE PREFERRED EMBODIMENT

The present invention relates generally to a method and system of editing a digital image to remove unwanted artefacts, objects and the like (hereinafter collectively referred to as "objects") by creating a texture to replace a delineated region or area of the subject digital image using pixels bordering the delineated area. During the method, an area of the digital image that is to be replaced with a texture is designated. Bands of pixels bordering the designated area are selected and blended according to blending functions to create the texture. The texture is inserted into the digital image to replace the pixels within the designated area and thereby remove the unwanted object. Since the texture is created using pixels of the background surrounding the unwanted object, the texture is basically indistinguishable from the background resulting in a high quality digital image.

The present invention is preferably embodied in a software application executed by a processing unit such as a personal computer or the like. The software application may run as a stand-alone digital image editing tool-or may be incorporated into other available digital image editing applications to provide enhanced functionality to those digital image editing applications. A preferred embodiment of the present invention will now be described more fully with reference to FIGS. 1 to 7*c*.

Figure 1:
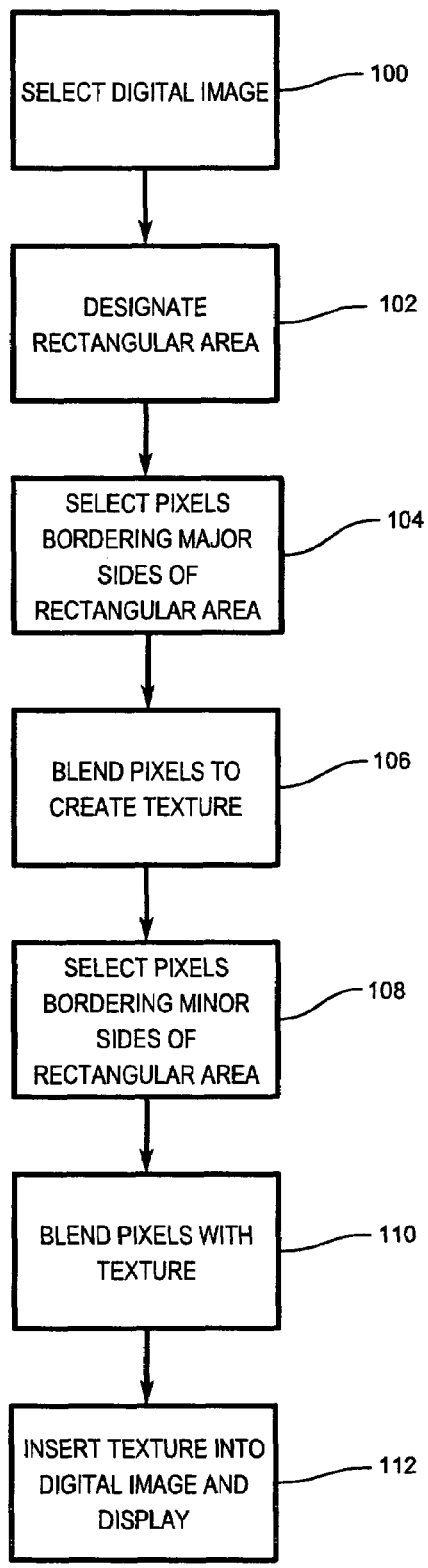
FIG. 1 is a flowchart showing the steps performed during a texture creation process in accordance with the present invention.

Turning now to FIG. 1, a flowchart showing a method of creating a texture to replace a delineated or designated area or region of a digital image in accordance with the present invention is shown. As can be seen, initially a user, through a graphical user interface as will be described, selects a digital image stored in memory, such as on the hard drive of a personal computer, for display (step 100). A rectangular area of the selected digital image to be replaced with a suitable texture is then designated by the user (step 102). Bands of pixels of the digital image bordering the opposite major sides of the designated rectangular area are then selected (step 104). The selected bands of pixels are blended according to a first blending equation as will be described to create a texture corresponding in size to the designated rectangular area (step 106). Bands of pixels of the digital image bordering the opposite minor sides of the designated rectangular area are then selected (step 108). These selected bands of pixels are blended with the texture according to a second blending equation as will be described thereby to complete the texture (step 110). The completed texture is inserted into the digital image to replace the pixels within the designated rectangular area and the image is displayed to the user (step 112). When the designated rectangular area encompasses an unwanted object, the unwanted object is removed from the digital image and replaced with a texture that is based on the surrounding background. The end result is a digital image devoid of the unwanted object that maintains high image quality since the texture is basically indistinguishable from the background of the digital image. Further specifics of the above method will now be described.

Figure 2A:
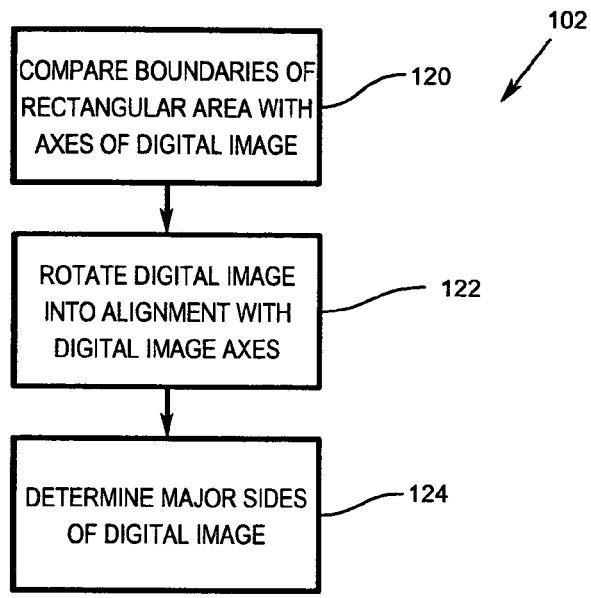
FIG. 2*a* is a flowchart showing the steps performed by the texture creation process of FIG. 1 when a rectangular area of a digital image is designated.

At step 102, when the designated rectangular area of the digital image to be removed is specified by the user, the boundaries of the designated rectangular area are compared with the horizontal rows and vertical columns of the pixels in the digital image to determine if the designated rectangular area is rotated with respect to the horizontal and vertical axes of the digital image (see step 120 in FIG. 2*a*). If the designated rectangular area has been rotated with respect to the horizontal and vertical axes of the digital image, the digital image is rotated to bring the boundaries of the designated rectangular area into alignment with the horizontal and vertical axes of the digital image (step 122).

Following alignment of the designated rectangular area with the horizontal and vertical axes of the digital image, the shape of the designated rectangular area is examined to determine its two largest or major opposite sides (step 124). Once the two largest opposite sides of the designated rectangular area have been determined, bands of pixels bordering these opposite major sides are selected and blended to create the texture (steps 104 and 106).

Figure 2B:
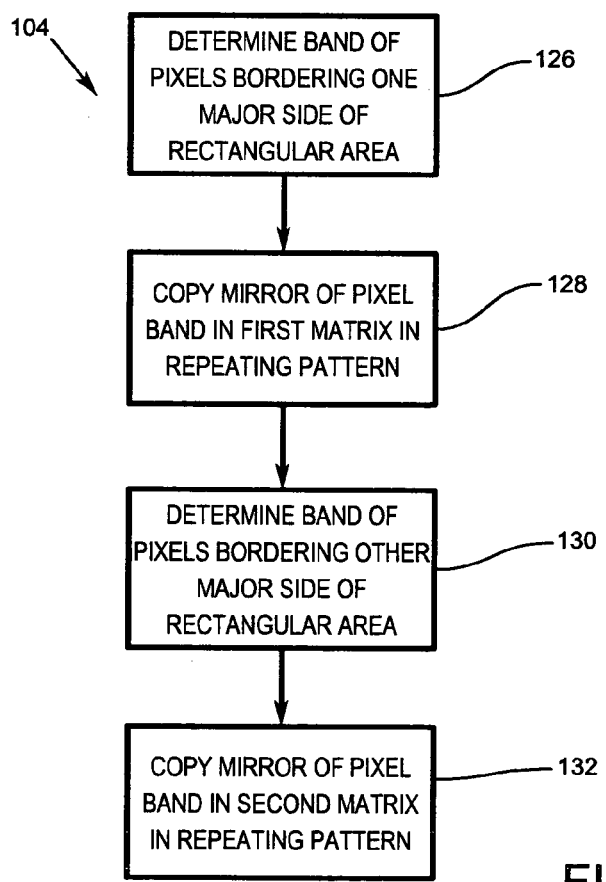
FIG. 2*b* is a flowchart showing the steps performed by the texture creation process of FIG. 1 when pixels bordering the major sides of the designated rectangular area are selected.
Figure 3A:
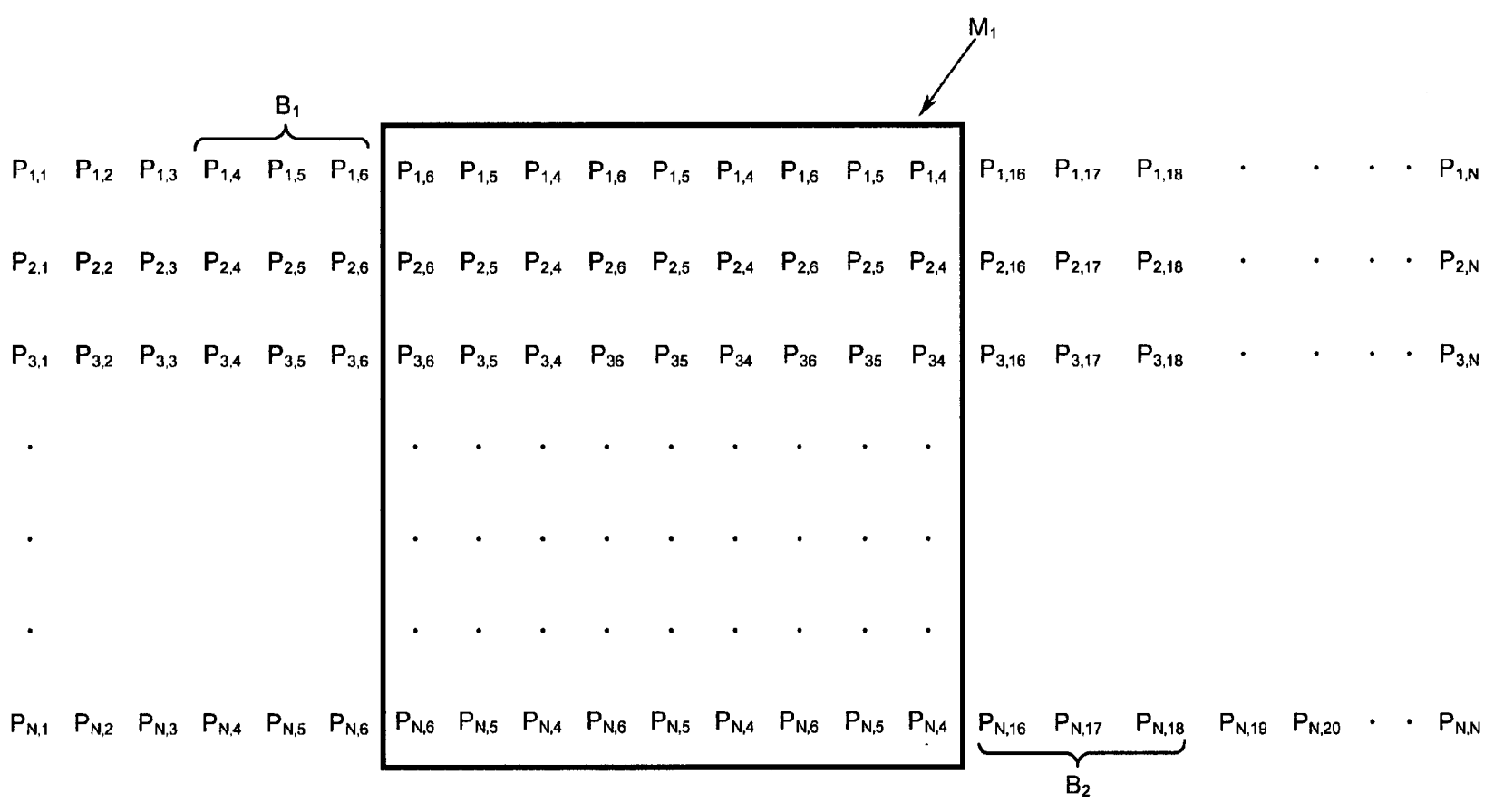

Turning now to FIGS. 2*b* and 3*a*, during pixel selection, a first band of pixels $B_1$ having a width MaxPoints that borders one of the largest sides is determined (step 126). The default MaxPoints value is fifteen (15) pixels. The MaxPoints value can however, be changed by a user via the graphical user interface. Generally a larger MaxPoints value is selected for larger images and a smaller MaxPoints value is selected for smaller images. A mirror of the pixel band $B_1$ is then copied in a repeating pattern to define a first pixel matrix $M_1$ having a size corresponding to the size of the designated rectangular area (step 128). A second band of pixels $B_2$ also of a width MaxPoints that borders the other largest side is then determined (step 130). A mirror of the second pixel band $B_2$ is copied in a repeating pattern to define a second pixel matrix having a size corresponding to the size of the designated rectangular area (step 132).

Figures 3B, 4:
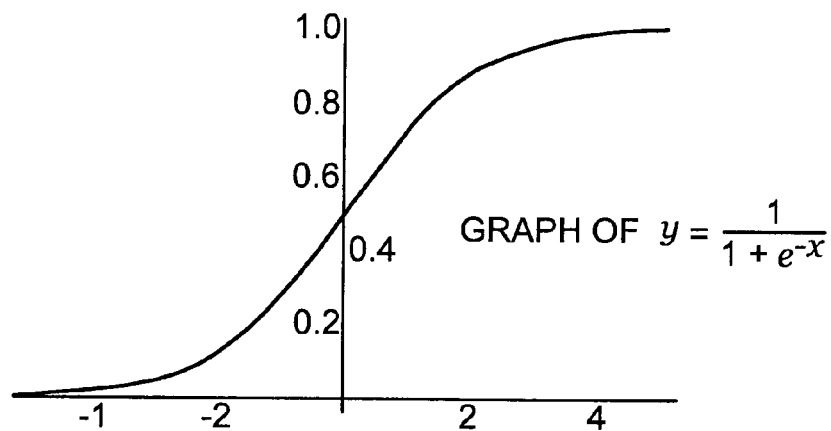
FIG. 3*b* shows an initial texture and bands of pixels bordering the minor sides of the designated rectangular area in the digital image.
FIG. 4 illustrates a blending function used during the texture creation process of FIG. 1.

After the first and second pixel matrices have been defined, the two pixel matrices are blended to form an initial texture $T_1$ as shown in FIG. 3b (step 106). During step 106, the pixels of the first and second matrices are blended according to the following equation:

$$\text{TextureFillValue}=\text{PixelWeight1}*\text{pixel1}+(1-\text{PixelWeight1})*\text{pixel2} \quad (1)$$

where:
pixel1 is the pixel at location (x,y) in the first matrix;
pixel2 is the pixel at location (N+1−x, N+1−y) in the second matrix;
PixelWeight1 is a first blending function; and
TextureFillValve is the resulting texture pixel at location (x,y) of the initial texture.

The blending function PixelWeight1 is defined by the following equation:

$$\text{PixelWeight1}=1.0/(1.0+\exp(-\text{ExponentScale}*x-\text{HalfWidth}))-(\text{CosAmplitude}*\cos(y*\text{CosFrequency})) \quad (2)$$

where:
x is the x co-ordinate relative to the top left corner of the designated rectangular area;
y is the y co-ordinate relative to the top corner of the designated rectangular area;
HalfWidth is one half of the width of the designated rectangular area;
ExponentScale is the gradient of the blending function; and
CosAmplitude, CosFrequency are characteristics of the blending boundary.

The parameter ExponentScale determines the degree of blending of the texture with the digital image. A higher ExponentScale value results in a smoother blend and a lower ExponentScale value results in a sharper blend. When the parameters CosAmplitude, CosFrequency are set to zero, the blending function PixelWeight1 takes the form shown in FIG. 4.

Once the first and second matrices have been blended to yield the initial texture $T_1$, further blending is performed using bands of pixels bordering the two smaller sides of the designated rectangular area. Specifically, a band of pixels $B_3$ and $B_4$ having a selected pixel width M, adjacent each smaller side of the designated rectangular area is selected (step 108). The default M value is ten (10) pixels. The M value can however, be changed by a user via the graphical user interface. A mirror of each band of pixels is then blended with a band of pixels $B_5$ and $B_6$ in the initial texture $T_1$ having a width M extending along the corresponding smaller side of the designated rectangular area (step 110). This blending is performed according to the blending equation:

$$\text{TextureFillValue}=\text{PixelWeight2}*\text{pixel1}+(1-\text{PixelWeight2})*\text{pixel2} \quad (3)$$

where:
pixel1 is the pixel in the initial texture at location (x,y);
pixel2 is the value of a pixel in the band bordering the smaller side of the designated rectangular area adjacent pixel1 and positioned outside of the designated rectangular area by the same distance as pixel1 is within the initial texture;
PixelWeight2 is a second blending function; and
TextureFillValue is the resulting texture pixel at location (x,y).

The second blending function PixelWeight2 is defined by the following equation:

$$\text{PixelWeight2}=(\text{\# of pixels from the edge of the smaller side of the designated rectangular area})/M \quad (4)$$

As will be appreciated, bands of pixels bordering the major sides of the delineated rectangular area are blended to create an initial texture. The initial texture is then modified by blending bands of pixels bordering the minor sides of the delineated rectangular area with the initial texture thereby to yield a final texture. With the final texture complete, the texture replaces the pixels within the delineated rectangular area (step 112).

Figure 5A:
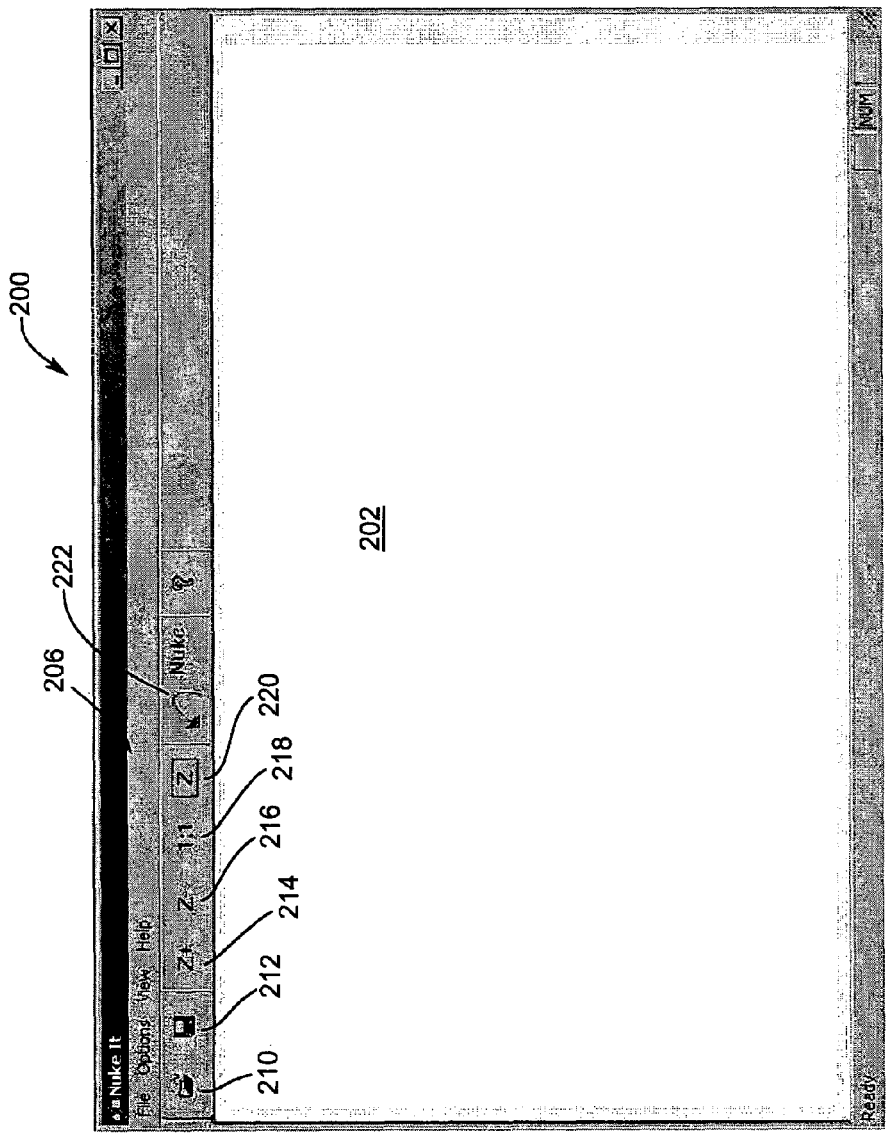
FIG. 5*a* is a screen shot showing the graphical user interface of a digital image editing tool in accordance with the present invention.
Figure 5B:
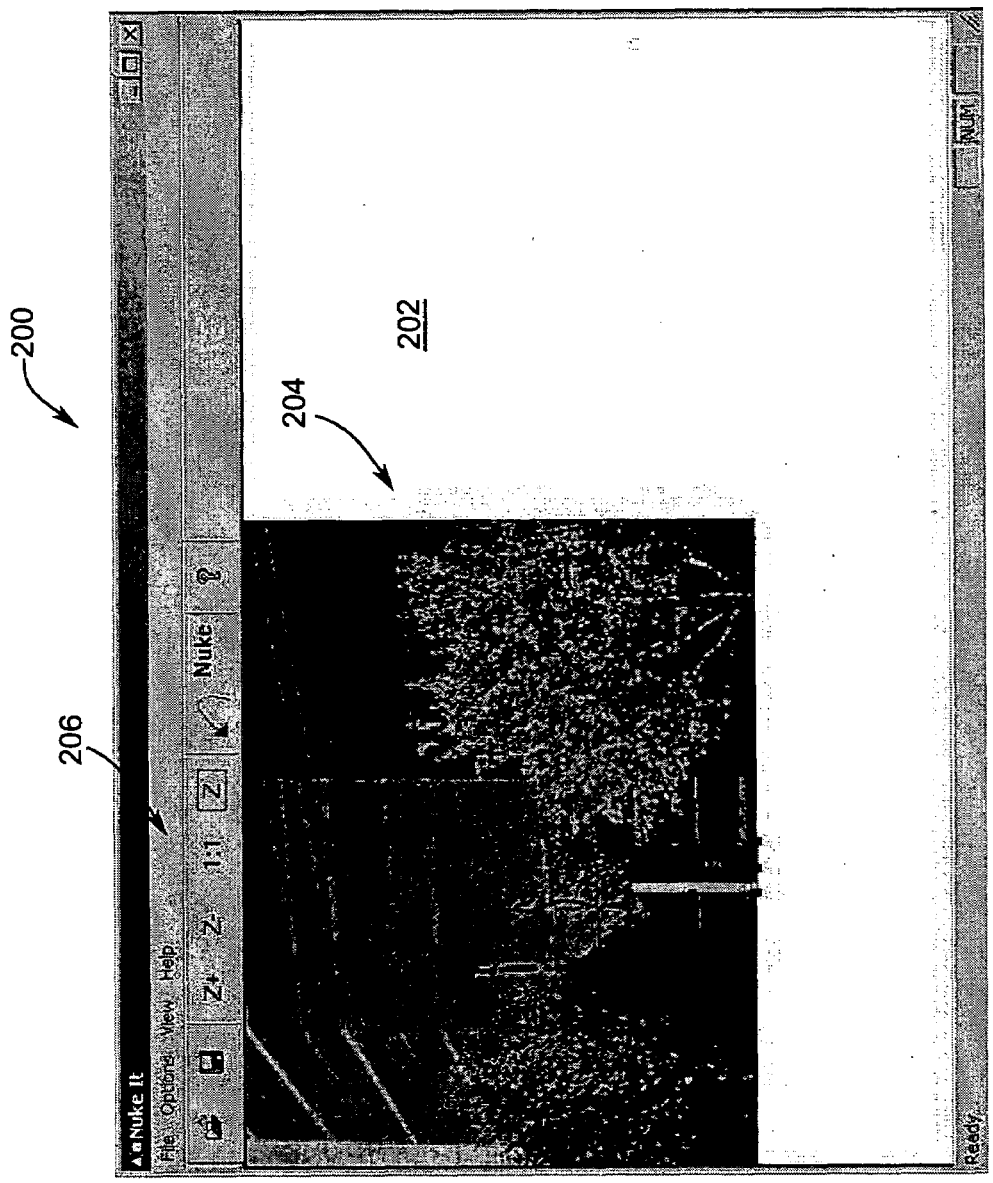
FIG. 5*b* is a screen shot showing the graphical user interface of FIG. 5*a* displaying a digital image to be edited in accordance with the texture creation process of FIG. 1.
Figure 5C:
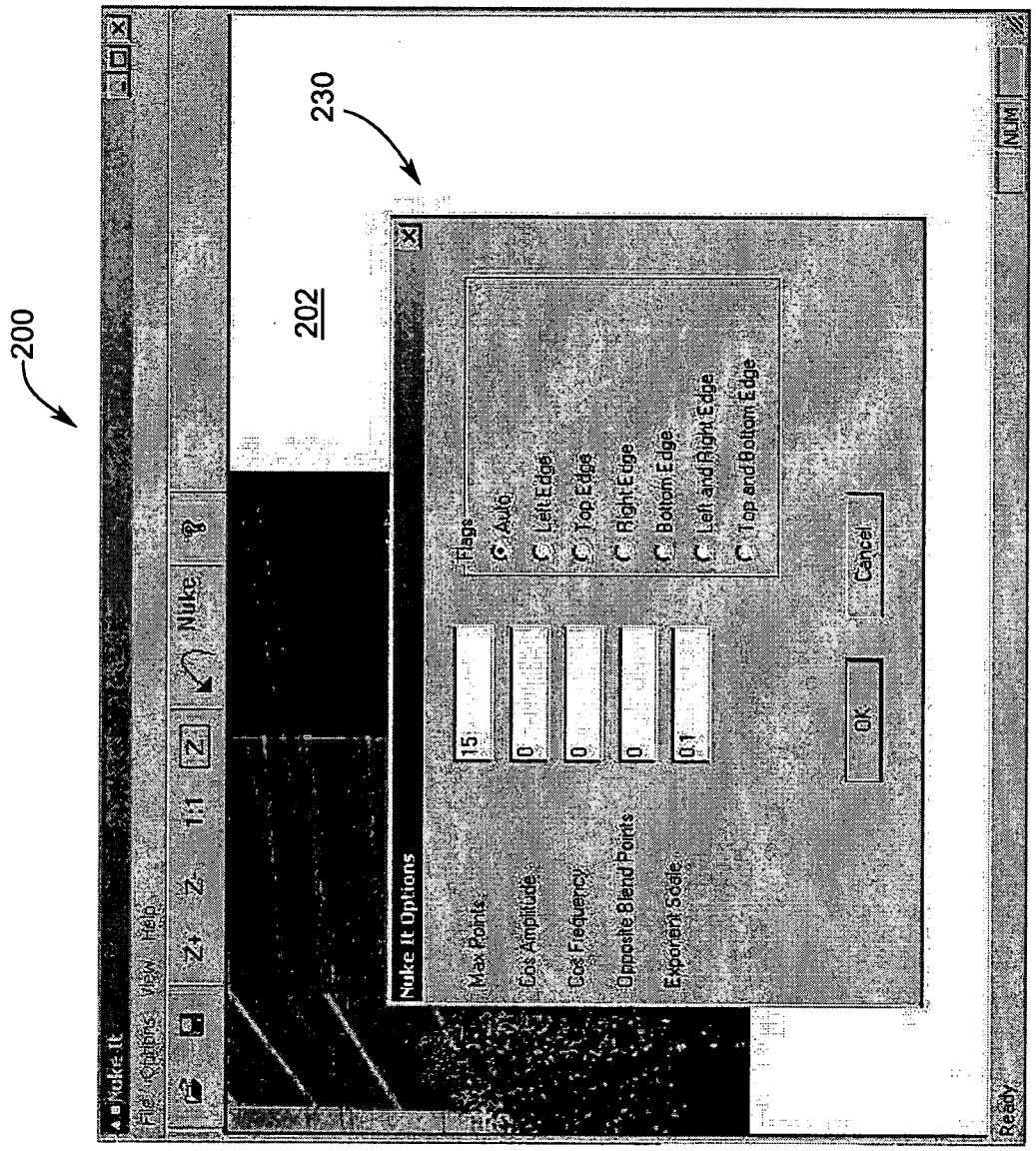
FIG. 5*c* is another screen shot showing the graphical user interface of the digital image editing tool.

FIGS. 5a to 5c are screen shots showing the graphical user interface of the digital image editing tool. As can be seen in FIGS. 5a and 5b, the graphical user interface 200 includes a palette 202 in which a digital image 204 to be edited is presented. A tool bar 206 extends along the top of the palette and includes a number of user selectable buttons. Specifically, the tool bar 206 includes an open digital image file button 210, a save digital image file button 212, a zoom-in Z+ button 214, a zoom-out Z− button 216, a 1:1 button 218, a fit-to-palette

button 220 and a perform editing button 222. Selecting the zoom-in Z+ button 214 enlarges the image presented in the palette 202 making it easier for the user to delineate smaller objects in the selected image with a rectangle. Selecting the zoom-out Z−button 216 shrinks the image presented in the palette 202 making it easier for the user to delineate larger objects in the selected image with a rectangle. Selecting the fit-to-palette

button 220 fits the entire image to the size of the palette 202.

FIG. 5c shows an option box 230 that is displayed when the "options" category in the toolbar 206 is selected. The option box 230 includes a plurality of fields that allow the parameters of the first blending equation PixelWeight1 and the MaxPoints value to be adjusted. The opposite blend points field allows the user to adjust the value of pixel width M. The radio buttons allow the user to override the automatic pixel blending method described above and select alternative pixel bands to be used to fill in the delineated rectangular area and create the texture. In particular, if the left edge radio button is selecting only pixels bordering the left edge of the rectangular area are used to fill in the rectangular area and create the texture. If the top edge radio button is selected only pixels bordering the top edge of the rectangular area are used to fill in the rectangular area and create the texture. If the right edge radio button is selected only pixels bordering the right edge of the rectangular area are used to fill in the rectangular area and create the texture. If the bottom edge radio button is selected only pixels bordering the bottom edge of the rectangular area are used to fill in the rectangular area and create the texture. As will be appreciated, in the above situations no pixel blending is performed. If the left and right edge radio button is selected, pixels bordering the left and right sides of the rectangular area are blended according to the first blending equation to fill in the rectangular area and create the texture. If the top and bottom edge radio button is selected, pixels bordering the top and bottom edges of the rectangular area are blended according to the first blending equation to fill in the rectangular area and create the texture.

Figure 6:
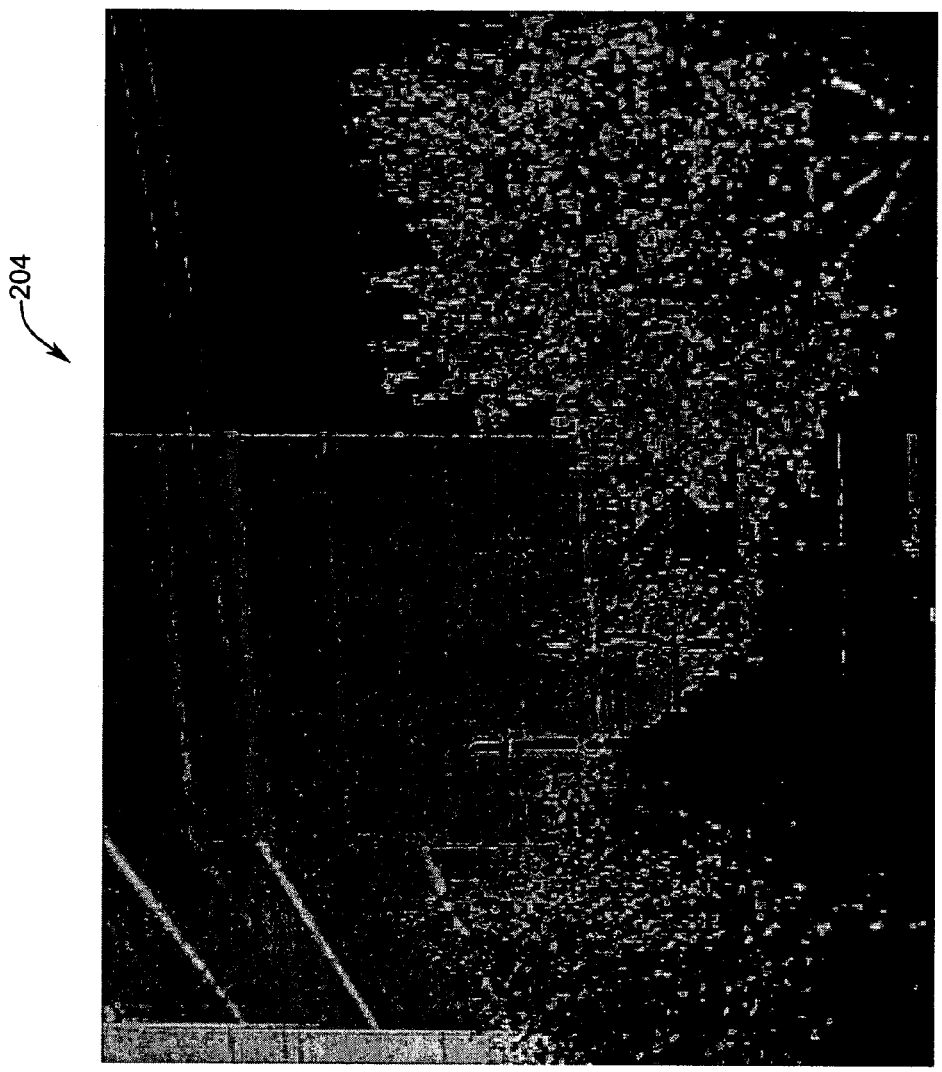
FIG. 6 shows the digital image illustrated in FIG. 5*b* with an unwanted object removed and replaced with a texture created in accordance with the texture creation process of FIG. 1.

FIG. 6 shows the digital image 204 presented in the palette 202 in FIG. 5b after having been edited using the digital image editing tool. In this example, the sign at the bottom center of digital image as seen in FIG. 5b has been delineated by a rectangle, removed and replaced with a texture in accordance with the texture creation process in FIG. 1.

Figure 7A:
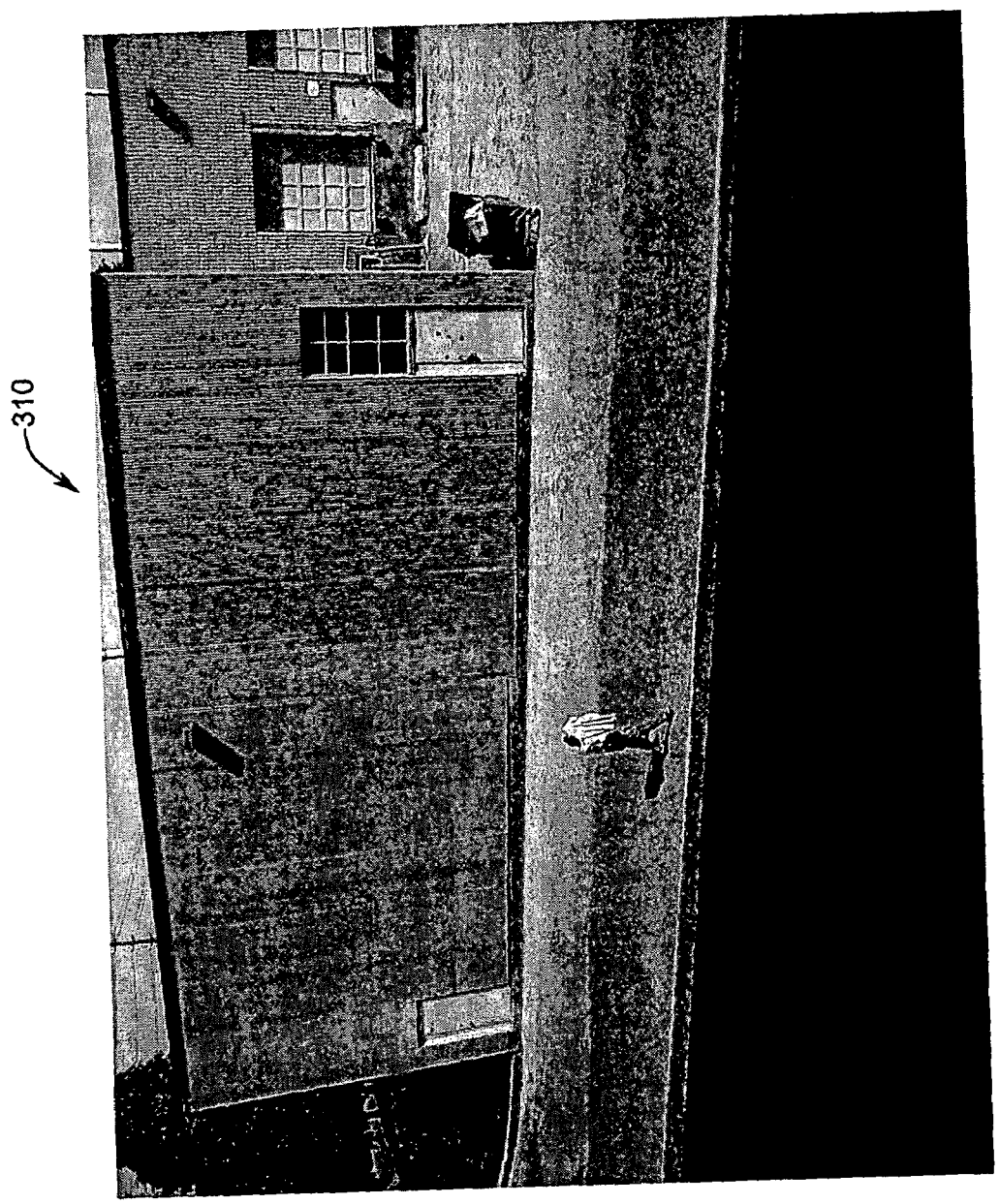
FIG. 7*a* shows another digital image.
Figure 7B:
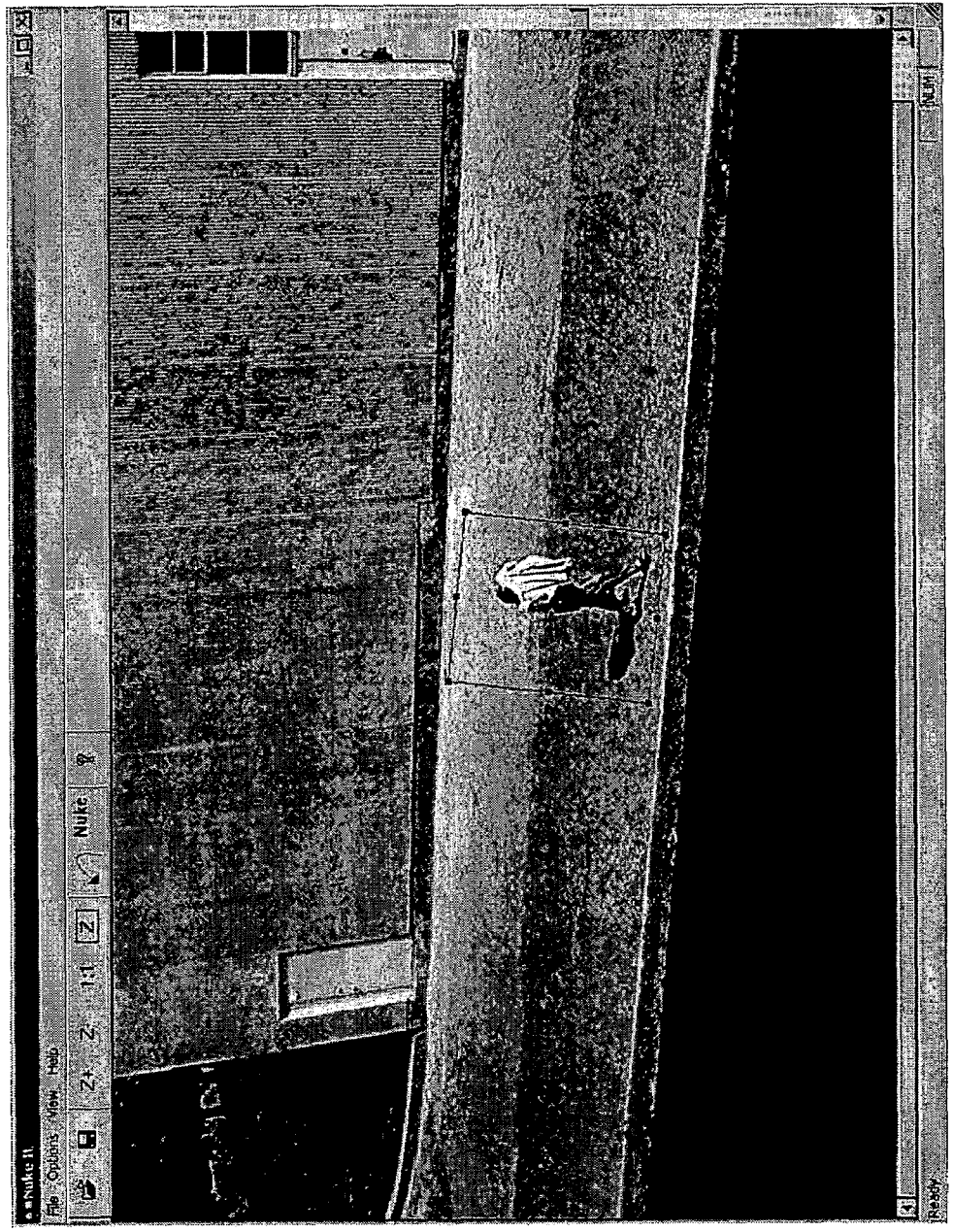
FIG. 7*b* shows the digital image of FIG. 7*a* with a portion delineated by a rectangle.
Figure 7C:
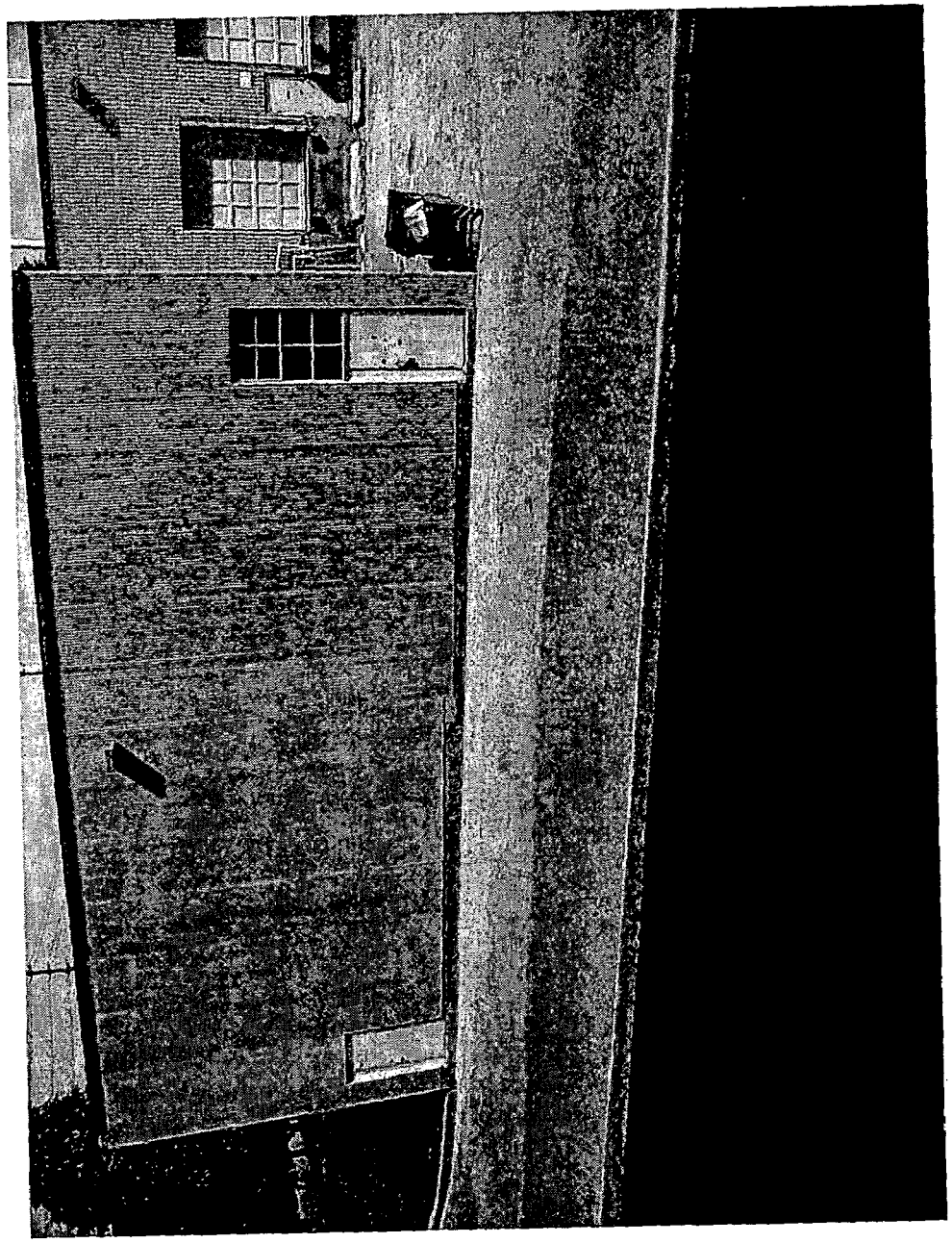
FIG. 7*c* shows the digital image of FIG. 7*a* with the delineated portion removed and replaced with a texture created in accordance with the texture creation process of FIG. 1.

FIGS. 7a to 7c show another digital image 310 that has been edited using the digital image editing tool. In this example, the individual in the center of the digital image is delineated by a rectangle as seen in FIG. 7b. The pixels within the rectangle are removed and replaced with a texture in accordance with the texture creation process of FIG. 1 as shown in FIG. 7c.

In the present embodiment, the designated area of the digital image to be replaced with a suitable replacement texture is described as being delineated by a rectangle. Those of skill in the art will appreciate that the designated area can be delineated by virtually any desired shape. Regardless of the shape of the designated area, bands of pixels bordering the designated area are blended to form the replacement texture.

The texture creation process has also been described as a background process where separate matrices are defined and then blended to form the initial texture, that itself is further blended before being inserted into the selected digital image. Those of skill in the art will appreciate that the texture creation process may be performed as a foreground process directly on the selected digital image. In this case, as the texture creation process is performed the pixels within the designated area of the selected digital image are modified in the series of steps described above until the designated area includes the final replacement texture.

The present invention can be embodied as computer readable program code stored on a computer readable medium. The computer readable medium is any data storage device that can store data, which can thereafter be read by a computer system. Examples of computer readable medium include read-only memory, random-access memory, CD-ROMS, magnetic tape and optical data storage devices. The computer readable program code can also be distributed over a network including coupled computer systems so that the computer readable program code is stored and executed in a distributed fashion.

Although a preferred embodiment of the present invention has been described, those of skill in the art will appreciate that variations and modifications may be made without departing from the spirit and scope thereof as defined by the appended claims.

What is claimed is:

1. A method of creating a texture to replace a designated area of a digital image comprising, the steps of:

selecting bands of pixels corresponding in value to pixels of said digital image that border said designated area; and blending the selected bands of pixels according to the first blending equation to create said texture;

wherein during said selecting bands of pixels of width MaxPoints bordering one pair of opposite sides of said designated area are selected;

wherein during said selecting, a mirror of the selected band of pixels of width MaxPoints on each opposite side of said designated area is selected and copied in a repeating pattern to define a pixel matrix corresponding in size to said designated area and wherein the created pixel matrices are blended according to said first blending equation to create said texture;

wherein said first blending equation is of the form:

$$\text{TextureFillValue} = \text{PixelWeight1} * \text{pixel1} + (1 - \text{PixelWeight1}) * \text{pixel2}$$

where:

pixel1 is the pixel at location (x, y) in the matrix created during copying of the mirror of the selected pixel band adjacent one of said sides;

pixel2 is the pixel at location (N+1−x, N+1−y) in the matrix created during copying of the mirror of the selected pixel band adjacent the other of said sides;

PixelWeight1 is a first blending function; and

TextureFillValue is the resulting texture pixel at location (x, y) of the texture.

2. The method of claim 1 wherein during said selecting, bands of pixels bordering at least two sides of said designated area are selected.

3. The method of claim 2 wherein during said selecting, bands of pixels bordering at least one pair of opposite sides of said designated area are selected.

4. The method of claim 3 further comprising the step of replacing pixels of said digital image within the designated area with said texture.

5. The method of claim 4 further comprising the step of displaying the digital image including said texture.

6. The method of claim 1 wherein said first blending function is expressed as:

$$\text{PixelWeight1} = 1.0 / (1.0 + \exp(-\text{ExponentScale} * x - \text{HalfWidth})) - (\text{CosAmplitude} * \cos(y * \text{CosFrequency}))$$

where:

x is the x co-ordinate relative to the top left corner of said designated area;

y is the y co-ordinate relative to the top left corner of said designated area;

HalfWidth is one half of the width of the designated area;

ExponentScale is the gradient of the first blending function; and

CosAmplitude, CosFrequency are characteristics of the blending boundary.

7. The method of claim 1 further comprising the steps of, after said blending, selecting further bands of pixels that border said designated area; and blending said further selected bands of pixels with pixels in said texture.

8. The method of claim 7 further comprising the step of replacing pixels of said digital image within the designated area with said texture.

9. The method of claim 8 further comprising the step of displaying the digital image including said texture.

10. The method of claim 7 wherein said designated area is delineated by a geometric shape and wherein during each of said selecting and further selecting, bands of pixels bordering opposite sides of said geometric shape are selected.

11. The method of claim 10 wherein said geometric shape is a rectangle, during said selecting, bands of pixels bordering opposite major sides of said rectangle being selected and during said further selecting, bands of pixels bordering opposite minor sides of said rectangle being selected.

12. The method of claim 11 wherein during said selecting, bands of pixels of width MaxPoints bordering opposite major sides of said rectangle are selected and wherein during said further selecting, bands of pixels of width M bordering opposite minor sides of said rectangle are selected, said width MaxPoints being greater than said width M.

13. The method of claim 12 wherein during said copying, a mirror of the selected band of pixels of width MaxPoints on each opposite side of said rectangle is copied in said repeating pattern.

14. The method of claim 13 wherein said first blending equation is of the form:

TextureFillValue=PixelWeight1*pixel1+(1−PixelWeight1)*pixel2 where:
pixel is the pixel at location (x,y) in the matrix created during copying of the mirror of the selected pixel band adjacent one of said major sides;
pixel2 is the pixel at location (N+1−x,N+1−y) in the matrix created during copying of the mirror of the selected pixel band adjacent the other of said major sides;
PixelWeight 1 is a first blending function; and
TextureFillValue is the resulting texture pixel at location (x,y) of the texture.

15. The method of claim 14 wherein said first blending function is expressed as:

PixelWeight1=1.0/(1.0+exp(−ExponentScale*$x$−HalfWidth))−(CosAmplitude*cos($y$*CosFrequency))

where:
x is the x co-ordinate relative to the top left corner of said rectangle;
y is the y co-ordinate relative to the top left corner of said rectangle;
HalfWidth is one half of the width of the rectangle;
ExponentScale is the gradient of the first blending function; and
CosAmplitude, CosFrequency are characteristics of the blending boundary.

16. The method of claim 15 wherein the blending of the further selected bands of pixels is performed using a second blending equation expressed as:

TextureFillValue=PixelWeight1*pixel1+(1−PixelWeight1)*pixel2 where:
pixel is the pixel in the texture at location (x,y);
pixel2 is the value of a pixel in the band bordering a minor side of the rectangle adjacent pixel1 and positioned outside of the rectangle by the same distance as pixel is within the texture;
Pixel Weight2 is a second blending function; and
TextureFillValue is the resulting texture pixel at location (x,y).

17. The method of claim 16 wherein said second blending function is expressed as:

PixelWeight2 =(#of pixels from the edge of the smaller side of the rectangle)/M.

18. The method of claim 17 further comprising the step of replacing pixels of said digital image within the rectangle with said texture.

19. The method of claim 18 further comprising the step of displaying the digital image including said texture.

20. A method of editing a digital image to remove an unwanted object comprising the steps of:
designating a rectangular region of said digital image including a subset of pixels within said digital image that includes the object to be removed;
selecting a band of pixels adjacent one major side of said rectangular region and copying a mirror of the selected band of pixels in a repeating pattern to define a first pixel matrix corresponding in size to said designated region;
selecting a band of pixels adjacent the opposite major side of said rectangular region and copying a mirror of the selected band of pixels in a repeating pattern to define a second pixel matrix corresponding in size to said designated region;
blending the pixels of said first and second matrices in accordance with a first blending equation to create an initial texture;
selecting a band of pixels adjacent one minor side of said rectangular region and blending a mirror of the selected band of pixels with a band of pixels of similar width in said initial texture that extends along said one minor side; and
selecting a band of pixels adjacent the other minor side of said rectangular region and blending a mirror of the selected band of pixels with a band of pixels of similar width in said initial texture that extends along said other minor side to complete said texture, said texture replacing the pixels within said designated rectangular region thereby to remove said object.

21. The method of claim 20 wherein said selecting and blending steps are performed as a background process.

22. The method of claim 20 wherein said selecting and blending steps are performed as a foreground process.

23. The method of claim 20 wherein said first blending equation is of the form:

TextureFillValue=PixelWeight1*pixel1+(1−PixelWeight1)*pixel2 where:
pixel is the pixel at location (x,y) in the matrix created during copying of the mirror of the selected pixel band adjacent one of said major sides;
pixel2 is the pixel at location (N+1−x,N+1−y) in the matrix created during copying of the mirror of the selected pixel band adjacent the other of said major sides;
PixelWeight 1 is a first blending function; and
TextureFillValue is the resulting texture pixel at location (x,y) of the texture.

24. The method of claim 23 wherein said first blending function is expressed as:

PixelWeight1=1.0/(1.0+exp(−ExponentScale*$x$−HalfWidth))−(CosAmplitude*cos($y$*CosFrequency))

where:
x is the x co-ordinate relative to the top left corner of said designated rectangular region;
y is the y co-ordinate relative to the top left corner of said designated rectangular region;
HalfWidth is one half of the width of the designated rectangular region;

ExponentScale is the gradient of the first blending function; and

CosAmplitude, CosFrequency are characteristics of the blending boundary.

25. The method of claim 24 wherein the blending of the bands of pixels adjacent the minor sides of the designated rectangular region with pixels of said initial texture is performed using a second blending equation expressed as:

TextureFillValue=PixelWeight1*pixel1+(1−Pixel-Weight1)*pixel2 where:
pixel is the pixel in the texture at location (x,y);
pixel2 is the value of a pixel in the band bordering a minor side of the designated rectangular region adjacent pixel and positioned outside of the designated rectangular region by the same distance as pixel is within the texture;
Pixel Weight2 is a second blending function; and
TextureFillValue is the resulting texture pixel at location (x,y).

26. The method of claim 25 wherein said second blending function is expressed as:

PixelWeight2 =(#of pixels from the edge of the minor side of the designated rectangular region)/M where:

M is the width of the pixel band.

27. A digital imaging editing tool for editing a digital image to remove an unwanted object comprising:
means for designating a rectangular region of said digital image including a subset of pixels within said digital image that includes the object to be removed;
means for selecting a band of pixels adjacent one major side of said rectangular region and copying a mirror of the selected band of pixels in a repeating pattern to define a first pixel matrix corresponding in size to said designated region;
means for selecting a band of pixels adjacent the opposite major side of said rectangular region and copying a mirror of the selected band of pixels in a repeating pattern to define a second pixel matrix corresponding in size to said designated region;
means for blending the pixels of said first and second matrices in accordance with a first blending equation to create an initial texture;
means for selecting a band of pixels adjacent one minor side of said rectangular region and blending a mirror of the selected band of pixels with a band of pixels of similar width in said initial texture that extends along said one minor side; and
means for selecting a band of pixels adjacent the other minor side of said rectangular region and blending a mirror of the selected band of pixels with a band of pixels of similar width in said initial texture that extends along said other minor side to complete said texture, said texture replacing the pixels within said designated rectangular region thereby to remove said object.

28. A digital imaging editing tool according to claim 27 wherein said first blending equation is of the form:

TextureFillValue=PixelWeight1*pixel1+(1−Pixel-Weight1)*pixel2 where:
pixel is the pixel at location (x,y) in the matrix created during copying of the mirror of the selected pixel band adjacent one of said major sides;
pixel2 is the pixel at location (N+1−x,N+1−y) in the matrix created during copying of the mirror of the selected pixel band adjacent the other of said major sides;
PixelWeight 1 is a first blending function; and
TextureFillValue is the resulting texture pixel at location (x,y) of the texture.

29. A digital imaging editing tool according to claim 28 wherein said first blending function is expressed as:

PixelWeight1=1.0/(1.0+exp(−ExponentScale*x−Half-Width))−(CosAmplitude*cos(y*CosFrequency))

where:
x is the x co-ordinate relative to the top left corner of said designated rectangular region;
y is the y co-ordinate relative to the top left corner of said designated rectangular region;
HalfWidth is one half of the width of the designated rectangular region;
ExponentScale is the gradient of the first blending function; and
CosAmplitude, CosFrequency are characteristics of the blending boundary.

30. A digital imaging editing tool according to claim 29 wherein the bands of pixels adjacent the minor sides of the designated rectangular region is blended with pixels of said initial texture according to a second blending equation expressed as:

TextureFillValue=−PixelWeight2*pixel1+(1−Pixel-Weight2)*pixel2 where:
pixel is the pixel in the texture at location (x,y);
pixel2 is the value of a pixel in the band bordering a minor side of the designated rectangular region adjacent pixel and positioned outside of the designated rectangular region by the same distance as pixel is within the texture;
Pixel Weight2 is a second blending function; and
TextureFillValue is the resulting texture pixel at location (x,y).

31. A digital imaging editing tool according to claim 30 wherein said second blending function is expressed as:

PixelWeight2 =(#of pixels from the edge of the smaller side of the designated rectangular region)/M where:
M is the width of the pixel band.

32. A computer readable medium embodying a computer program for editing a digital image to remove an unwanted object therein, said computer program including:
computer program code for designating a rectangular region of said digital image including a subset of pixels within said digital image that includes the object to be removed;
computer program code for selecting a band of pixels adjacent one major side of said rectangular region and copying a mirror of the selected band of pixels in a repeating pattern to define a first pixel matrix corresponding in size to said designated region;
computer program code for selecting a band of pixels adjacent the opposite major side of said rectangular region and copying a mirror of the selected band of pixels in a repeating pattern to define a second pixel matrix corresponding in size to said designated region;

computer program code for blending the pixels of said first and second matrices in accordance with a first blending equation to create an initial texture;

computer program code for selecting a band of pixels adjacent one minor side of said rectangular region and blending a mirror of the selected band of pixels with a band of pixels of similar width in said initial texture that extends along said one minor side in accordance with a second blending equation different than said first blending equation; and computer program code for selecting a band of pixels adjacent the other minor side of said rectangular region and blending a mirror of the selected band of pixels with a band of pixels of similar width in said initial texture that extends along said other minor side in according with said second blending equation to complete said texture, said texture replacing the pixels within said designated rectangular region thereby to remove said object.

* * * * *

UNITED STATES PATENT AND TRADEMARK OFFICE
CERTIFICATE OF CORRECTION

PATENT NO. : 7,260,273 B2
APPLICATION NO. : 10/637344
DATED : August 21, 2007
INVENTOR(S) : Graham Sellers et al.

It is certified that error appears in the above-identified patent and that said Letters Patent is hereby corrected as shown below:

<u>Column 11,</u>

Line 24, change "pixel" to --pixel1--;
Lines 52 and 53, change "TextureFillValue =PixelWeight*pixel1 + (1-PixelWeight1)*pixel2" to --**TextureFillValue = -PixelWeight2*pixel1 + (1-PixelWeight2)*pixel2**--;
Line 56, change "pixel" to --pixel1--; and
Line 59, change "pixel is" to --pixel1 is--.

<u>Column 12,</u>

Line 46, change "pixel" to --pixel1--.

<u>Column 13,</u>

Lines 9 and 10, change "TextureFillValue = PixelWeight1*pixel1 + (1-PixelWeight1)*pixel2" to --**TextureFillValue = -PixelWeight2*pixel1 + (1-PixelWeight2)*pixel2**--;
Line 12, change "pixel" to --pixel1--;
Line 15, change "adjacent pixel" to --adjacent pixel1--;
Line 17, change "distance as pixel" to --distance as pixel1--; and
Line 65, change "pixel" to --pixel1--.

<u>Column 14,</u>

Line 34, change "pixel" to --pixel1--;
Line 36, change "pixel" to --pixel1--; and

UNITED STATES PATENT AND TRADEMARK OFFICE
CERTIFICATE OF CORRECTION

PATENT NO. : 7,260,273 B2 Page 2 of 2
APPLICATION NO. : 10/637344
DATED : August 21, 2007
INVENTOR(S) : Graham Sellers et al.

It is certified that error appears in the above-identified patent and that said Letters Patent is hereby corrected as shown below:

Line 38, change "pixel" to --pixel1--.

Signed and Sealed this

Fourth Day of November, 2008

JON W. DUDAS
*Director of the United States Patent and Trademark Office*